HENRI ARNOLD JOHANNES DE BIJLL NACHENIUS.
REVERSIBLE TRAVERSING MOTION.
APPLICATION FILED APR. 29, 1919.
1,350,560. Patented Aug. 24, 1920.
4 SHEETS—SHEET 1.
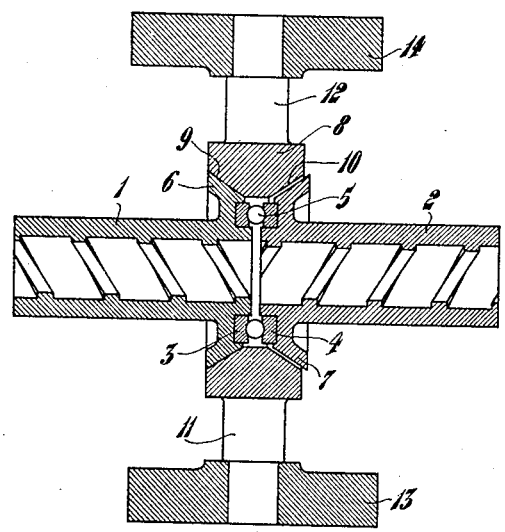
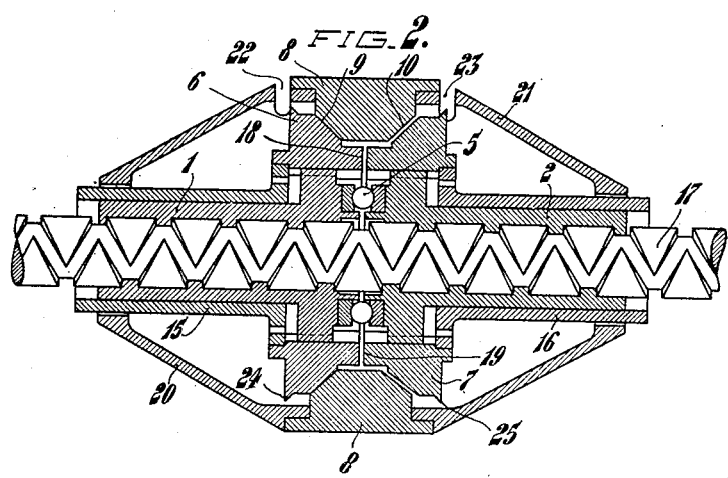
Inventor
Henri Arnold Johannes
de Bijll Nachenius
by Lawrence Langner
Attorney

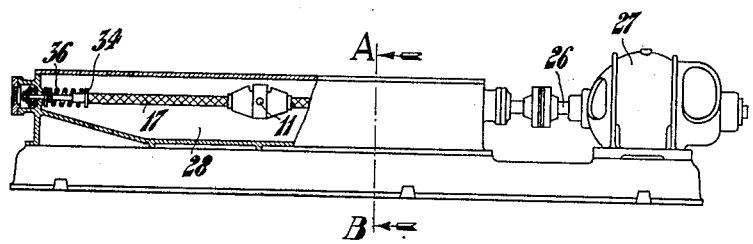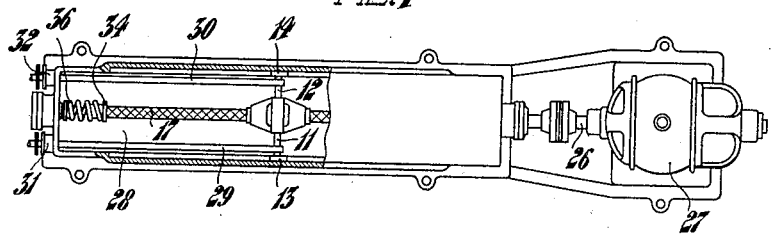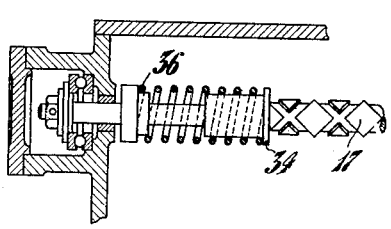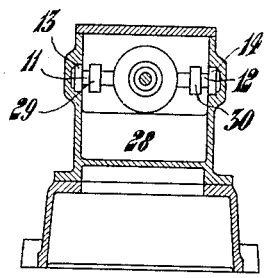

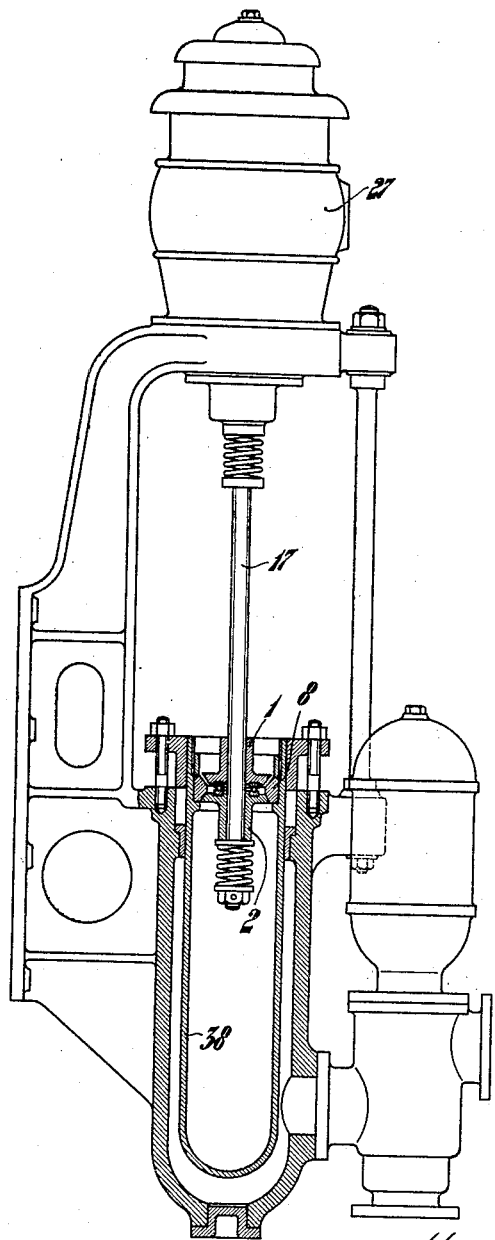

HENRI ARNOLD JOHANNES DE BIJLL NACHENIUS.
REVERSIBLE TRAVERSING MOTION.
APPLICATION FILED APR. 29, 1919.

1,350,560.  Patented Aug. 24, 1920.
4 SHEETS—SHEET 4.

Inventor
Henri Arnold Johannes
de Bijll Nachenius
by Laurence Laugner
Attorney

UNITED STATES PATENT OFFICE.

HENRI ARNOLD JOHANNES DE BIJLL NACHENIUS, OF HAARLEM, NETHERLANDS.

REVERSIBLE TRAVERSING MOTION.

1,350,560.  Specification of Letters Patent.  Patented Aug. 24, 1920.

Application filed April 29, 1919. Serial No. 293,461.

*To all whom it may concern:*

Be it known that I, HENRI ARNOLD JOHANNES DE BIJLL NACHENIUS, a subject of the Queen of the Netherlands, residing at Haarlem, Netherlands, have invented certain new and useful improvements in Reversible Traversing Motions, of which the following is a specification.

This invention is for improvements in and relating to reversible traversing motions of the kind in which linear motion is given to a traversing member by means of screw threads, each with a nut mounted thereon, the traversing member being provided with friction surfaces coöperating with corresponding friction surfaces on the nuts.

The constructions hitherto employed have the inconvenient feature that the reversal of the linear motion is not automatic and must be effected manually by more or less complicated mechanism.

The object of the present invention is to obtain automatic reversing of the traversing member. According to this invention, preferably spring loaded arresting means adapted to coöperate with the nuts are provided at the ends of the screws.

In order that the automatic reversing of the traversing member may be effected in two stages, I may mount on each of the nuts a sleeve free to slide axially thereon but locked against rotation, and provide each of said sleeves with a friction surface coöperating with a corresponding friction surface on the traversing member as well as with a friction surface mating with a corresponding friction surface on the other sleeve, so that on axial displacement of one sleeve relative to the other the last mentioned friction surfaces will contact before the sleeves engage or disengage the traversing member.

In the accompanying drawing:

Figure 1 is a sectional view of the traversing member and of the nuts;

Fig. 2 is a sectional view of the traversing member, nuts and sleeves for a two-stage reversing, the rotating element, constituted by a screw spindle having both right and left hand threads cut upon it, being illustrated in elevation;

Fig. 3 is a part sectional elevation of a complete transmission gear constructed in accordance with the principles of the invention;

Fig. 4 is a plan view of the gear shown in Fig. 3;

Fig. 5 is a part sectional view of a detail of the gear shown in Fig. 3;

Fig. 6 is a cross-section on the line A—B in Fig. 3 on an enlarged scale;

Fig. 7 is a part sectional view of a pump embodying the invention;

Figure 8:
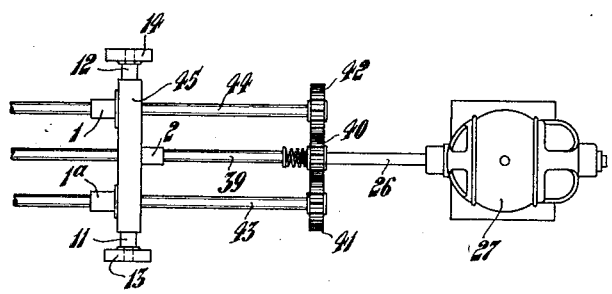
Fig. 8 is a plan view of a gear comprising three parallel screws all having threads of the same type cut upon them.

In Fig. 1, the reference numerals 1 and 2 designate a right-hand and a left-hand nut respectively, mounted upon an axially fixed screw (not shown) having both right and left hand threads each made to engage the corresponding nut as required. The inner faces of the nuts are provided with races 3 and 4 respectively, both adapted to contact with a row of balls 5, and further said nuts have cone-shaped friction surfaces 6 and 7 whose apexes point in opposite directions. Mounted between these friction cones is an annular member 8 provided with corresponding internal friction cones 9, 10, it being understood that when the races 3 and 4 are both in engagement with the balls 5 and the cone 9 is in contact with the cone 6, the cones 10 and 7 are clear of one another. The annular member 8 is integral with trunnions 11, 12 secured to which are slippers 13, 14 guided by suitable surfaces (not shown). It will be readily understood that the ball bearing 3, 4, 5 is no essential element in the construction, and that it may be replaced by any other suitable thrust bearing.

Assuming the screw on which the nuts 1 and 2 are mounted to be rotated at high speed, for instance, by an electric motor, and further assuming the cone 6 to be forced into engagement with the internal cone 9, the nut 1 will have no freedom of rotary motion, so that it will travel along the screw, for instance, to the right. This axial movement is transmitted by the thrust bearing 3, 4, 5 to the nut 2 which, owing to the clearance between its friction surface 7 and the mating surface 10, will thus idly rotate on the screw spindle at a speed twice that of the spindle. Now, suppose the nut 2 to be arrested at the end of its path, then the force that tends to move the nut 2 to the left is transmitted through the ball bearing 3, 4, 5 to the nut 1, whereby the end pressure exerted by the screw spindle on the nut 1, and consequently the circumferential force that tends to rotate the nut 1 are increased. As soon as this circumferential force exceeds the constant frictional resistance between cones 6 and 9, the cone 6 is permitted to slip on the friction surface 9, whereby the nut 1 is free to follow the rotation of the screw spindle. Owing to their momentum the annular member 8 and the parts associated therewith continue moving to the right until the mating surfaces 10 and 7 contact with one another, whereby the nut 2 is held against rotation by the member 8 and, in consequence, commences to travel along the screw spindle to the left, driving the nut 1 rotating idly ahead of it. Similarly, when the inactive nut 1 abuts against the arresting means provided at the left hand end of the screw spindle, it will again be locked against rotation, the nut 2 having been previously released, so that the reverse traverse is automatically brought about.

The taper of the mating friction surfaces is determined so that when the end pressure needed to maintain the surfaces in driving contact is removed the coöperating surfaces will at once cease to adhere, and disengagement at once takes place.

In Fig. 2, each of the nuts 1 and 2 carries a sleeve 15 and 16 respectively to freely slide but not rotate thereon. Said sleeves have friction cones 6, 7 mating with corresponding friction cones 9, 10 on the annular member 8, and plane friction surfaces 18, 19 at right angles to the axis of the screw spindle 17, the arrangement being such that on the sleeve 16 being moved from the position shown toward the sleeve 15, the friction surfaces 18, 19 move into end contact with each other prior to the friction cone 7 engaging its mate cone 10.

Assuming the sleeve 16 to be arrested at the end of its right hand stroke, it will move to the left relative to the nut 2 so as to bring about end contact between the plane friction surfaces 18 and 19. In consequence, a portion of the momentum of nut 2 and associated parts (sleeve 16 and cone 7) is conversed into friction, thus producing a circumferential force which tends to cause the cone 6 to turn relative to the cone 9 of ring 8; as soon as slipping occurs, the cone 6, the sleeve 15 and the nut 1 are free to follow the rotation of nut 2. The moment the cones 7 and 10 are forced into driving contact, the cone 7, the sleeve 16 and the nut 2 are held against rotation, whereby the nut 2 becomes active and moves to the left, driving the nut 1 and associated parts rotating idly on the screw spindle ahead of it.

The screw spindle 17 with the nuts thereon is preferably mounted in an oil casing. As the oil in said casing offers considerable resistance to the idly rotating nut, the annular member 8 is provided with two cone-shaped shields 20 and 21 respectively surrounding with little clearance the sleeves 15 and 16. Said shields are provided at the top side with apertures 22, 23 opposite the sharp edged bases 24, 25 of friction cones 6, 7. By this arrangement the nuts always rotate in air, for the small quantity of oil entering through the clearance between the shields 20, 21 and the sleeves 15, 16 is discharged through the openings 22, 23 by centrifugal force.

In Figs. 3, 4, 5 and 6 the shaft 26 of an electric motor 27 is coupled with a spindle 17 having both right and left hand threads cut upon it and carrying a mechanism substantially as illustrated in Fig. 2. The screw spindle and the traversing member are mounted in an oil casing 28. The annular member 8 is integral with trunnions 11, 12 moving with slippers 13, 14 on longitudinal guide surfaces of the casing 28 and pivoted to connecting rods 29, 30 projecting outside the case through stuffing boxes 31, 32. Said connecting rods may be coupled in any convenient manner with the member to which reciprocating motion is to be imparted.

Slidably mounted on the screw spindle 17 adjacent its opposite ends is a pair of arresting members 34, (only one of which appears) each loaded by a coiled spring 36. The said spring has for its duty not only to resiliently take up the impact caused by the reversal of the traversing member, but also, by its relaxation after being compressed, to positively force the idly rotating nut against the annular member 8, which may be necessary if the momentum of the traversing member and associated parts, after disengagement of the active nut, is not sufficient to cause the movement to continue until the ring 8 contacts with the inactive nut, for instance, in the case of pumps.

It will be understood that the stroke of the traversing member may be varied simply by adjusting the distance between the arresting members 34 in some convenient manner.

Fig. 7 shows an embodiment of the invention wherein an electric motor 27 with vertical shaft drives the plunger 38 of a pump through the medium of the nuts 1 and 2 mounted on the screw spindle 17 in alinement and coupled with the motor shaft.

Figures 9, 10:
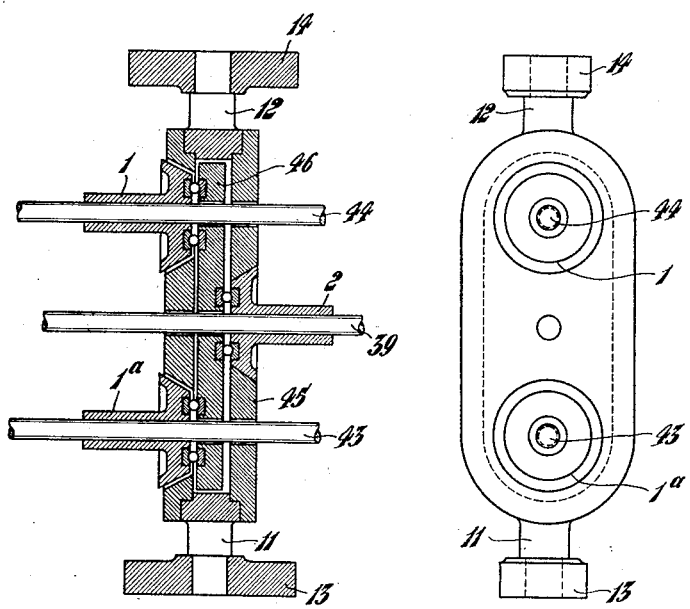
Fig. 9 illustrates on an enlarged scale the traversing member of the gear shown in Fig. 8.
Fig. 10 is a front view of Fig. 9.

In Figs. 8, 9 and 10, a spindle 39 is coupled in alinement with the shaft 26 of an electric motor 27, a gear 40 keyed upon said spindle meshing with gears 41, 42 on parallel spindles 43, 44, so that on the motor being started rotary motion will be imparted to the spindles 43, 44 in a direction opposite to that of spindle 39. The spindles 39, 43, 44, which have all the threads of the same type cut upon them, extend through openings in the front and rear walls of a casing 45, secured to which are trunnions 11, 12 and slippers 13, 14 guided by suitable guide surfaces (not shown). The openings in the front and rear walls of the casing 45 have conical faces mating with the conical friction surfaces on nuts 1, 1ª and 2 mounted on the screw spindles 44, 43 and 39 respectively. Inside the casing 45 is a plate 46 having freedom of axial displacement therein and provided with races forming parts of the thrust ball bearings by which the end pressures of the nuts at one side of the casing 45 are transmitted to the nut at the opposite side. The operation of this transmission gear will be understood without further explanation.

In transmission gear of the type referred to it is obviously necessary for the pitch of the screws to exceed a certain limit as otherwise the idly rotating inactive nut would produce such a resistance as to act self stopping.

When using right and left hand screw threads for reciprocating the nuts, I may give the screws different pitches so that the traversing member travels with greater speed in the one direction than in the other. With an arrangement similar to that shown in Fig. 8 I may obtain the same effect by allowing the screw spindles rotating clockwise to turn at a higher speed than those rotating counterclockwise.

Although the provision of fixed or spring loaded arresting means as described on the screw spindle or spindles is the simplest way of automatically bringing about the engagement and disengagement of the nuts 1, 2 on the one side, and the annular member 8 or the casing 45 on the other side, it is evident that other means may be employed for the same purpose, for instance, automatically operated clutch couplings.

Having now particularly described and ascertained the nature of my present invention and in what manner the same is to be performed, I declare that what I claim is:

1. In a traversing motion, the combination of a screw having both right-hand and left-hand threads thereon; nuts coactive with said threads, each nut having a friction surface; a traversing member having friction surfaces for coaction with those on the nuts; and means disposed at the opposite ends of the screw for coaction with said nuts to effect automatic reversal of the traversing member.

2. In a traversing motion, the combination of a screw having both right-hand and left-hand threads thereon; nuts coactive with said threads, each nut having a friction surface; a traversing member having friction surfaces for coaction with those on the nuts; and resilient arresting means disposed at the opposite ends of the screw for alternate engagement with said nuts to effect automatic reversal of the traversing member.

3. In a traversing motion, the combination of a screw having both right-hand and left-hand threads thereon; nuts coactive with said threads; a traversing member adapted to be coupled to and uncoupled from said nuts in alternation; and resilient means disposed at the opposite ends of the screw for coaction with said nuts to automatically effect their alternate coupling and the consequent reversal of the traversing member.

4. In a traversing motion, the combination of rotating driving means; nuts threaded thereon and having conical friction surfaces; a traversing member mounted on said driving means and having conical friction surfaces coactive with those on the nuts; and means disposed at the opposite ends of the driving means for coaction with said nuts to effect their alternate coupling and the consequent reversal of the traversing member.

5. In a traversing motion, the combination of rotating driving means; nuts threaded thereon; a sleeve mounted on each nut for axial sliding movement but locked against rotation, each sleeve having a pair of separate friction surfaces; a traversing member having a pair of friction surfaces for coaction with one pair of the friction surfaces on the sleeves; the other pair of friction surfaces on the sleeves mating with each other and adapted to contact, on relative axial movement of the sleeves, prior to the engagement or disengagement of the firstnamed pair of surfaces with or from those on the traversing member; and means disposed at the opposite ends of the driving means for coaction with the nuts to effect automatic reversal of the traversing member.

In testimony whereof I affix my signature.

HENRI ARNOLD JOHANNES DE
BIJLL NACHENIUS.

Witnesses:
D. KLIYN,
M. ALVARADO.